May 13, 1969 A. E. ARCH 3,443,273

TAPE HANDLING ELEMENT

Filed April 4, 1967 Sheet 1 of 2

INVENTOR.
ANDREW E. ARCH
BY
Christie, Parker & Hale
ATTORNEYS.

INVENTOR.
ANDREW E. ARCH
BY Christie, Parker & Hale
ATTORNEYS.

United States Patent Office 3,443,273

Patented May 13, 1969

3,443,273

TAPE HANDLING ELEMENT

Andrew E. Arch, Arcadia, Calif., assignor to Burroughs Corporation, Detroit, Mich., a corporation of Michigan Filed Apr. 4, 1967, Ser. No. 628,480
Int. Cl. A47l *5/38;* B65h *23/32*
U.S. Cl. 15—308 17 Claims

ABSTRACT OF THE DISCLOSURE

A first surface is adapted to guide the movement of tape in a direction parallel to its length. A second surface is adapted to fix the position of the tape transverse to its length at the first surface when one edge of the tape is in contact therewith. A force is exerted at at least two points on the other edge of the tape in a direction transverse to its length so as to hold the one edge of the tape in contact with the second surface. Preferably the force is exerted by a gimbal-mounted spring. The first surface is cylindrical and two parallel rows of openings are arranged transverse to the length of tape. A vacuum source is connected to the openings behind the first surface. As a result, dust particles are washed from the tape as it passes over the first surface.

BACKGROUND OF THE INVENTION

This invention relates to tape transport apparatus and, more particularly, to a tape handling element suitable for guiding the movement of tape during transport and cleaning the tape surface.

The practice of packing binary information on magnetic tape at high density creates problems in tape transport. Currently, binary information is packed so tightly that it has been found necessary to compensate for variations in the width of magnetic tape while writing information onto tape and reading information from the tape. One edge of the tape is usually forced into contact with a stationary surface, thus insuring that this edge of the tape has a predetermined position as it passes over the read or write head.

Dust particles and other foreign matter are also a problem in present-day tape transport systems. With the high packing densities used, it is not uncommon for dust particles of the same order of magnitude as the area on the magnetic tape occupied by a binary bit of information to exist in the atmosphere. When such large dust particles come to rest on the oxided surface of the tape, the probability that an error will occur in reading information from the tape or recording information on the tape increases greatly.

SUMMARY OF THE INVENTION

The invention contemplates a tape handling element suitable for fixing the position of one edge of the tape and for cleaning dust particles from the tape surface. The tape handling element has a convexly curved first surface adapted to guide the movement of tape in a direction parallel to its length and a second surface adapted to fix the position of tape transverse to its length when one edge of the tape is in contact therewith. A force is exerted at at least two points on the other edge of the tape in a direction transverse to its length to hold the one edge of the tape in contact with the second surface. By exerting force on the other edge of the tape at at least two points, the position of the tape transverse to its length is more positively determined, especially in the case of abrupt variations in tape width. Preferably the force is exerted by a spring that is gimbal-mounted.

The first surface has openings through it which are connected to a source of fluid at a pressure different from the ambient pressure, preferably a vacuum source. As air is drawn through the openings to the vacuum source, it passes over the surface of the tape, thereby washing dust particles from it. More advantageously, the first surface is convexly curved in the direction of the length of tape and the openings are arranged in two rows transverse to the length of tape. Thus, the tape comes into contact with the first surface between the two rows of holes and tapers away from the surface as it passes over the holes to permit fluid to flow between the tape and the first surface.

A feature of the invention provides that the surface through which the force is applied to the edge of the tape is directly attached to the spring. Consequently, the mass that the spring must move remains small so a fast response time is possible.

BRIEF DESCRIPTION OF THE DRAWINGS

The features of a specific embodiment of the invention are illustrated in the drawings, in wihch.

DESCRIPTION OF A SPECIFIC EMBODIMENT

Figure 3:
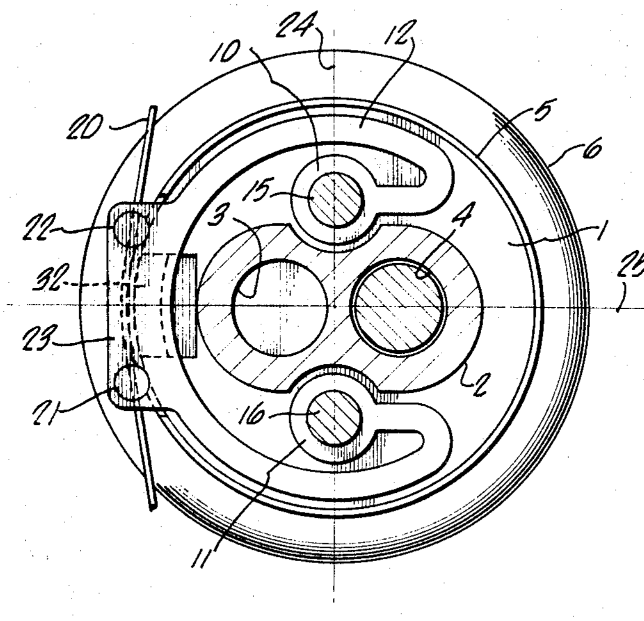
FIG. 3 is a bottom view in section of the element of FIG. 2.

The tape handling element has a core with a cylindrical upper portion 1 and a lower portion 2, whose cross section is illustrated in FIG. 3. Openings 3 and 4 extend longitudinally through the core. Portion 1 is enclosed by a thin cover 5 wrapped around and extending below its cylindrical surface. A cap 6 mounted on the end of the core provides a flange for cover 5. The tape handling element is attached to a deck plate 7 by a screw 8 passing through opening 4. The head of screw 8 bears on a lock washer 9. Mounting eyelets 10 and 11 of a spring 12 are held flush against the bottom of portion 1 by one end of spacers 13*a* and 13*b*, respectively. Between the ends of spring 12 formed by eyelets 10 and 11, a center portion extends in the form of a loop. Spring 12 could be stamped out of a flat sheet of resilient material such as beryllium copper. Hard, wear-resistant beads 21 and 22, which could be made of sapphires, are attached at spaced-apart points on a platform portion 23 of spring 12. A stop 14 for spring 12 abuts the other end of spacers 13*a* and 13*b*. Screws 15 and 16 pass through openings in spacers 13*a* and 13*b*, respectively, openings in stop 14, eyelets 10 and 11, respectively, and threaded openings in the bottom of portion 1, which are not shown in the drawings.

Figure 2:
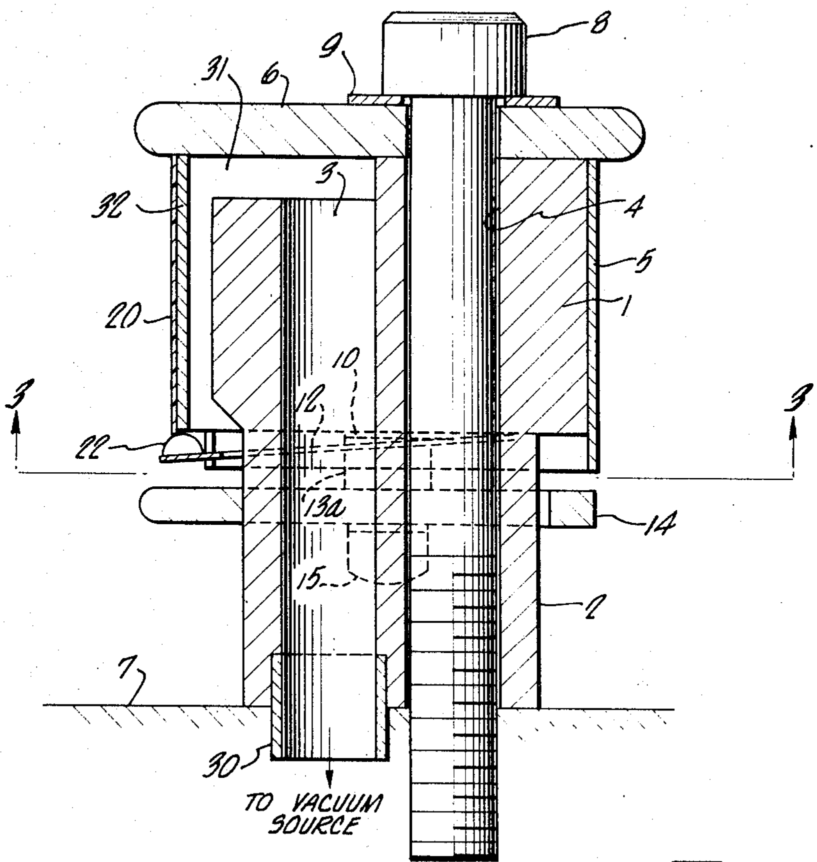
FIG. 2 is a front elevation view in section of the element of FIG. 1 showing a length of tape as well.

A length of tape 20 (FIGS. 2 and 3) passes over a portion of the cylindrical surface of cover 5, which serves to guide the movement of tape in a direction parallel to its length. In positioning tape 20 between cap 6 and spring 12 along the surface of cover 5, as illustrated in FIG. 2, the center portion of spring 12 is deflected. Accordingly, spring 12 exerts a force through beads 21 and 22 on the lower edge of tape 20, thereby driving its upper edge against the flange surface of cap 6. The flange surface of cap 6 serves to fix the position of the tape transverse to its length, or more specifically, the position of the upper edge of the tape. As a result of the described construction, spring 12 is gimbal-mounted on the bottom of portion 1, i.e., it has two degrees of freedom. It is free to move about either an axis 24 or about an axis 25 (FIG. 3). Consequently, spring 12 urges both beads 21 and 22 into contact with the lower edge of tape 20, even if the width of tape 20 is different at the points of contact of beads 21 and 22. Thus, the entire portion of the upper edge of tape 20 that lies underneath cap 6 is essentially pushed into contact with the flange surface of cap 6 to provide a more precise determination of the position of the upper edge of tape 20 despite abrupt variations in tape width. These abrupt variations in tape width might not be compensated for satisfactorily if spring 12 were mounted with only one degree of freedom. In such case, spring 12 might exert force on the lower edge of tape 20 only at a single point, because the tape has a different width at the other point or points, and then accordingly might push the upper edge of tape 20 against the surface of cap 6 only at a single point. Thus, it can be seen the skew misalignment of the tape as it passes the read or write head can be reduced by the tape handling element of the invention.

Instead of beads 21 and 22, a single block could be mounted on platform portion 23. Preferably, the block would extend the length of platform portion 23. In either case, force is exerted on the lower edge of tape 20 at at least two points. The use of two beads is, however, preferable to the use of a single block because the force can then be exerted on the lower edge with less tape wear. Since only beads 21 and 22 intervene between spring 12 and tape 20, spring 12 must only move a small mass. As a result, the mechanism responds quickly to variations in tape width.

Figure 1:
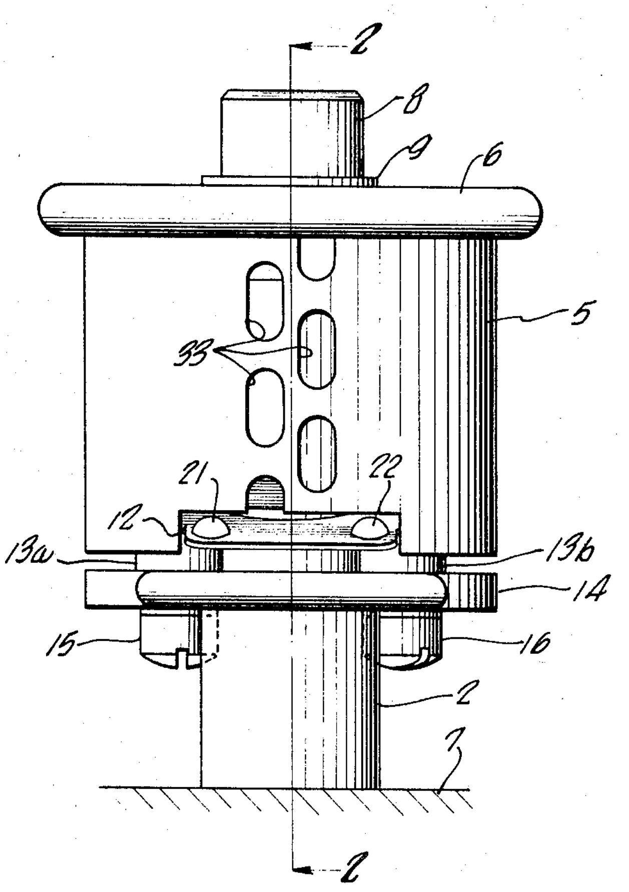
FIG. 1 is a side elevation view of a tape handling element incorporating the principles of the invention.

A conduit 30, which is connected to a vacuum source not shown in the drawing, leads into the bottom of opening 3. A radial slot 31 is cut in the top of portion 1. Openings 33 in the portion of cover 5, across which tape 20 passes, are arranged in two parallel rows transverse to the length of tape (FIG. 1). Instead of plural openings in each row, a single slot running the length of cover 5 could be used. A slot 32 is cut in the cylindrical surface of portion 1 behind openings 33. The vacuum source draws air from outside of the tape handling element through openings 33 and into the chamber formed by slot 32 and cover 5. From the chamber, air is drawn through slot 31 and opening 3 into conduit 30. Tape 20 contacts the surface of cover 5 in the area between the two rows of openings and tapers away from the surface of cover 5 as it passes over the openings. By virtue of the fact that cover 5 is rounded, air is funnelled between the tape and the surface of cover 5 as it is drawn into openings 33 and washes dust particles from the surface of tape 20. As the air passes through openings 33, it also tends to draw tape 20 toward the surface of cover 5. The edges of openings 33 are roughened slightly to scrape loose particles from the tape. The tape handling element is particularly well suited for use in a closed system such as disclosed in a copending application of Harry F. Rayfield, Ser. No. 608,594, filed Jan. 11, 1967, entitled "Tape Apparatus," and assigned to the assignee of the present invention.

Although the term "tape" is used throughout the specification because the invention is particularly designed to meet the problems of magnetic tape, the invention is applicable generally in the transport of flexible strips of elongated material. Thus, the term "tape" in this specification is understood to include not only magnetic tape, but punched paper tape, rolls of photographic film, and other ribbon type media.

What is claimed is:

1. A tape handling element comprising: a first surface adapted to guide the movement of tape in a direction parallel to its length; a second surface adapted to fix the position of tape transverse to its length when one edge of the tape is in contact therewith; and a gimbal-mounted spring for exerting a force at at least two points on the other edge of the tape in a direction transverse to the length of tape to hold the one edge of the tape in contact with the second surface, the spring having two spaced apart end portions that are attached to a stationary surface and a center portion that extends in a loop beween the end portions, the center portion being deflected by the other edge of the tape so as to exert a force thereon.

2. The tape handling element of claim 1, in which a contact surface with at least two points on the other edge of the tape is provided on the center portion of he spring midway beween the end portions.

3. The tape handling element of claim 2, in which the contact surface comprises two spaced-apart, wear-resistant beads.

4. The tape handling element of claim 1, in which a stop is provided to limit the deflection of the spring.

5. A tape handling element comprising: a first surface adapted to guide the movement of tape in a direction parallel to its length, the first surface having openings through it; a second surface adapted to fix the position of tape transverse to its length when one edge of the tape is in contact therewith; a source of fluid at a pressure different than the ambient pressure connected to the openings behind the first surface to establish fluid flow therethrough; and means for exerting a force at at least two points on the other edge of the tape in a direction transverse to the length of tape to hold the one edge of the tape in contact with the second surface.

6. The tape handling element of claim 5, in which the first surface has openings through it, and a source of fluid at a pressure different from the ambient pressure is connected to the openings behind the first surface to establish fluid flow therethrough.

7. The tape handling element of claim 6, in which the first surface is convexly curved along the length of tape and the openings are arranged in two parallel rows transverse to the length of tape.

8. The tape handling element of claim 5, in which the source is at a pressure substantially lower than the ambient pressure.

9. The tape handling element of claim 5, in which the first surface is formed by part of a cylinder having a chamber behind the openings and the connecting means is a conduit between the chamber and the source.

10. The tape handling element of claim 5, in which the edges of the openings are roughened to scrape loose particles from tape passing over the surface.

11. The tape handling element of claim 5, in which the surface is convexly curved in the direction of the length of tape and the openings are arranged in an even number of parallel rows oriented transverse to the length of tape.

12. The tape handling element of claim 11, in which the surface is formed by a cylinder.

13. In a tape handling system the combination comprising: a length of flexible tape; a convexly curved first surface coming into contact with the tape to guide tape movement in a direction parallel to its length; a flat second surface extending perpendicularly from the first surface at one end, one edge of the tape being contiguous with the second surface; and means for exerting a force at at least two points on the other edge of the tape in a direction transverse to the length of tape so as to push the one edge of the tape into contact with the second surface.

14. The tape handling element of claim 13, in which the means for exerting a force is a spring mounted with two degrees of freedom.

15. The tape handling element of claim 14, in which the spring has two end portions that are fixed to a stationary surface and a free-moving center portion connecting the end portions.

16. The tape handling element of claim 15, in which the spring has a normally flat configuration and the center portion is deflected by the other edge of the tape.

17. The tape handling element of claim 15, in which the center portion extends in a loop between the end portions.

References Cited

UNITED STATES PATENTS

| | | | |
|---|---|---|---|
| 2,726,859 | 12/1955 | Dolamore | 226—198 X |
| 3,035,295 | 5/1962 | Buslik et al. | |
| 3,119,140 | 1/1964 | Sallet. | |
| 3,276,651 | 10/1966 | Bryer | 226—198 X |

ALLEN N. KNOWLES, *Primary Examiner.*

U.S. Cl X.R.

226—198